March 30, 1937.　　　A. L. PARKER　　　2,075,460
VALVE ASSEMBLY
Filed Sept. 23, 1936
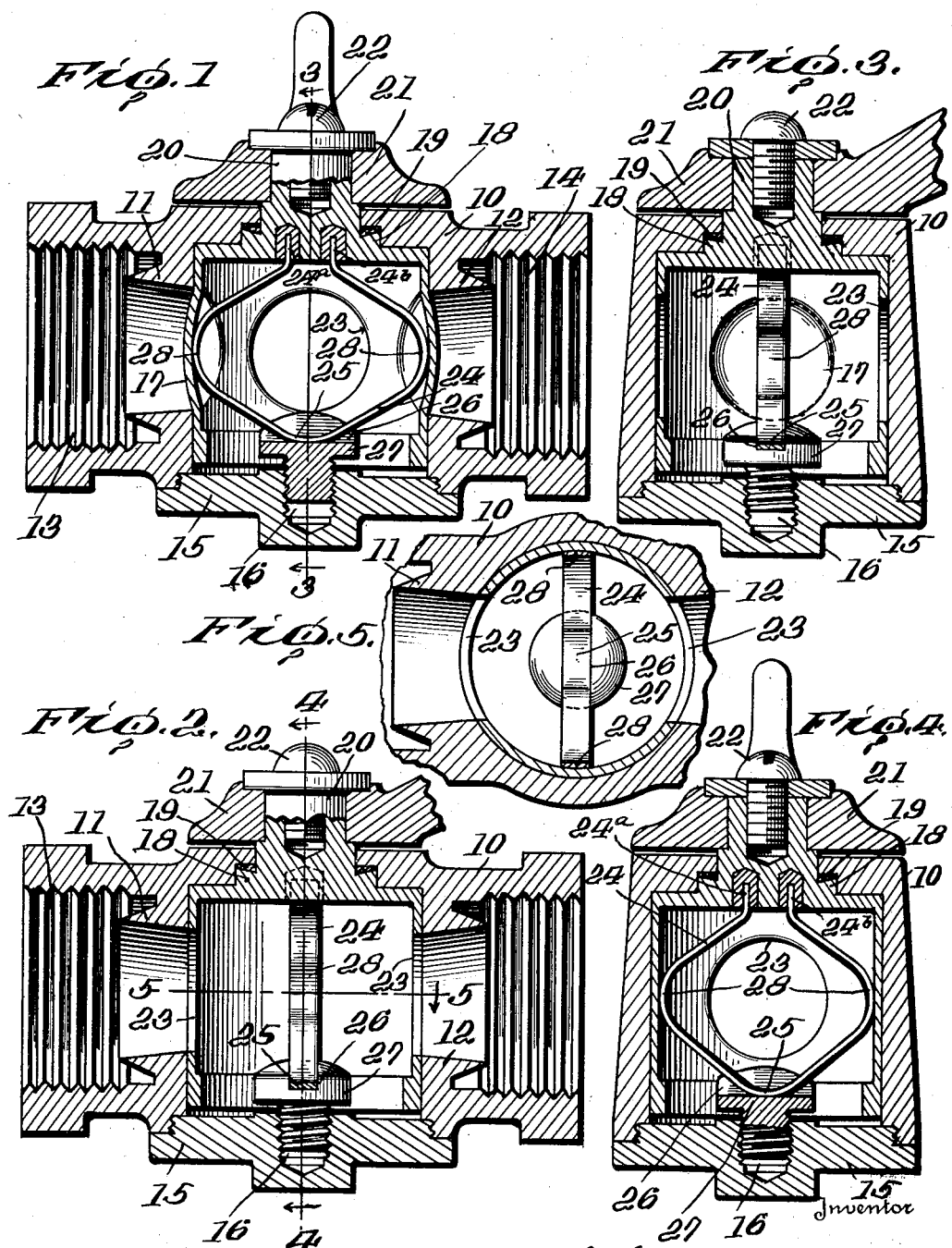

Patented Mar. 30, 1937

2,075,460

UNITED STATES PATENT OFFICE 2,075,460

VALVE ASSEMBLY

Arthur L. Parker, Cleveland, Ohio

Application September 23, 1936, Serial No. 102,181

8 Claims. (Cl. 251—96)

The present invention relates to new and useful improvements in a valve assembly and more particularly to improvements in a rotatable valve assembly of the general type shown and described in my copending application Serial No. 90,420, filed July 13, 1936.

An object of the invention is to provide a valve assembly wherein communication between a plurality of ports in a valve casing is controlled by a valve member which may be slightly flexed so as to provide a tight sealing contact with at least one of the ports when the valve is closed and wherein the flexing force may be reduced when the valve is opened.

A further object of the invention is to provide a valve assembly wherein communication between a plurality of ports in a valve casing is controlled by a valve member having a substantially cylindrical wall portion which may be flexed slightly centrally of at least one of the ports when the valve is closed so as to afford a tight sealing contact therearound and wherein the flexing force exerted against the wall portion of the valve member may be reduced when the valve is turned to an open position.

A further object of the invention is to provide a valve assembly wherein the wall portion of a rotatable cylindrical valve member may be flexed slightly centrally of the ports in the valve casing when the valve is closed so as to afford a tight sealing contact around the edges of the ports and wherein the flexing force exerted against the wall portion of the valve member may be reduced automatically when the valve is turned to an open position.

A further object of the invention is to provide a valve assembly of the above type wherein spring means carried by the valve is adapted to bear against the inner face thereof so as to flex the wall portion thereof centrally of the ports in the valve casing when the valve is in a closed position and wherein the flexing force exerted by the spring means is automatically reduced when the valve is turned to an open position.

The above and other objects of the invention will in part be obvious and will be hereinafter more fully set forth.

In the drawing:

Fig. 1 is a side view in section showing the improved valve assembly with the valve member in closed position.

Fig. 2 is a side view in section, similar to Fig. 1, but showing the valve member in open position.

Fig. 3 is a section taken along the line 3—3 of Fig. 1.

Fig. 4 is a section taken along the line 4—4 of Fig. 2.

Fig. 5 is a fragmentary sectional view taken along the line 5—5 of Fig. 2.

The invention relates generally to a valve assembly which includes a valve member for controlling communication between a plurality of ports through a valve casing. In the illustrated embodiment of the invention, the valve member is in the form of a rotatable cylinder which is provided with openings therethrough which, in an open position, are adapted to register with ports in the valve casing, and, in a closed position, to shut off communication between the ports in the valve casing. The cylindrical wall portion of the valve member is slightly flexible and spring means are provided for flexing the wall portion centrally of the ports in the valve casing so as to afford tight sealing contact between the edges of the ports and the valve member. The spring means are connected at one end to the valve member so as to be rotatable therewith and at the opposite end to a freely rotatable member which is carried by the valve casing. The freely rotatable member is threaded in the valve casing so that rotation of the valve member to a closed position and the consequent rotation of the freely rotatable member will serve to increase the force exerted by the spring means against the cylindrical wall portion of the valve member so as to flex the same centrally of the ports in the valve casing. When the valve member is turned to an open position, the consequent rotation of the freely rotatable member will serve to relieve the force exerted by the spring means against the cylindrical wall portion of the valve member so that it may be more easily manipulated with a minimum of frictional resistance.

Referring more in detail to the accompanying drawing, a body or valve casing 10 is provided with inlet and outlet ports 11, 12 and with internally threaded projecting end portions 13, 14 to which may be connected suitable conduit means.

A vertical opening through the bottom of the valve casing 10 is closed by a threaded closure member or cap 15 which is provided with an inwardly extending internally threaded recess 16. The valve member for controlling the inlet and outlet ports 11, 12 is illustrated as being in the form of a cylindrical cup or shell 17, the cylindrical wall of which is relatively thin and may be slightly flexed. The closed or upper end of the cylindrical shell 17 is provided with an offset portion 18 which forms a shoulder on which is disposed a packing 19. The closed end of the shell 17 is also provided with a stem portion 20 which extends through an opening in the top of the valve casing 10 and has secured thereto an operating handle 21 by means of a screw 22 or the like. In the illustrated embodiment of the invention, the cylindrical wall portion of the shell 17 is provided with diametrically opposed openings 23 which are adapted to register, in the closed position of the valve, with the inlet and outlet ports 11, 12 of the valve casing.

The free ends 24a, 24b of a spring member 24 are suitably mounted in the closed or upper end of the shell 17. The lower portion 25 of the spring 24 is disposed within a slot 26 in the upper end of a rotatable member 27 which engages the threaded recess 16 in the cap or plug 15. The portion 25 of the spring member 24 consequently bears against the member 27 and, upon rotation of the valve member, the spring member 24 will cause similar rotation of the member 27, thus raising and lowering the said member 27 with respect to the plug 15. Side portions 28 of the spring member 24 bear against the inner face of the cylindrical wall portion of the shell 17.

In assembling the valve, the plug 15 is removed, and the cylindrical shell 17 with the spring member 24 properly positioned therein is inserted through the opening at the bottom of the valve casing 13. The plug 15 with the member 27 disposed within the threaded recess 16 therein is secured to the casing 10 with the lower portion 25 of the spring member 24 disposed within the slot 26 in the rotatable member 27. The handle 20 is then secured to the stem portion 20 of the valve member so that it may be conveniently operated.

To open the valve, the cylindrical shell 17 is rotated so that the openings 23 therethrough will register with the ports 11, 12 in the valve casing, as shown in Figs. 2, 4 and 5. To close the valve, the shell is rotated to the position shown in Figs. 1 and 3 of the drawing wherein the wall portion of the shell intermediate the openings 23 thereto close communication between the inlet and outlet ports 11, 12. Rotation of the cylindrical shell 17 causes similar rotation of the member 27 in the plug 15. Thus, when the valve is turned toward a closed position, the rotatable member 27 will be elevated relative to the plug 15, thus increasing the pressure exerted by the portions 28 of the spring 24 against the cylindrical wall portion of the shell 17. This increased pressure causes an outward flexing of the cylindrical wall portion of the ports 11, 12 in the valve casing so as to assure a tight sealing contact around the edges thereof. When the valve is turned toward an open position, the opposite rotation of the member 27 will cause it to descend relative to the plug 15 so as to relieve the tension exerted by the spring member 24 against the cylindrical wall portion of the shell. This automatic adjustment of the tension exerted by the spring member 24 renders the valve highly efficient in use and at the same time easily operable with a minimum of friction.

From the foregoing description it will be readily seen that the present invention provides a valve assembly wherein a portion of the valve member may be flexed centrally of at least one of the ports in the valve casing so as to afford a tight sealing contact around the edges of the port and the valve member to thus close communication through the valve casing. It will be further seen that the force exerted by the flexing means is automatically increased as the valve is turned to a closed position so as to insure a tight seal and that the flexing force is automatically decreased as the valve is turned to an open position in order to reduce frictional resistance incident to the manipulation of the valve.

It is, of course, to be clearly understood that the novel features of the invention may be applied to various types of valves and that the form shown in the accompanying drawing is for purposes of illustration only. Various changes in the details of construction and arrangement of parts may be made without departing from the scope of the invention as set forth in the appended claims.

I claim:

1. A valve assembly comprising a valve casing having a port therethrough, a valve member having a flexible portion for controlling the said port, means for forcing the flexible portion of said valve member centrally of said port when the valve is closed whereby to afford a tight sealing contact between the edge of the port and the valve member, and means for automatically reducing the flexing force exerted against the valve member as the valve is opened.

2. A valve assembly comprising a valve casing having a port therethrough, a valve member having a flexible portion for controlling said port, spring means for forcing the flexible portion of said valve member centrally of the port when the valve is closed whereby to afford a tight sealing contact between the edge of the port and the valve member, and means for reducing the force exerted by said spring means against the flexible portion of said valve member as the valve is opened.

3. A valve assembly comprising a valve casing having a port therethrough, a valve member having a flexible portion for controlling said port, a spring member for forcing the flexible portion of said valve member centrally of the port when the valve is closed, and means carried by said valve casing and movable with said valve member for automatically reducing the force exerted by said spring member against the flexible portion of said valve member as the valve is opened.

4. A valve assembly comprising a valve casing having a port therethrough, a valve member having a flexible substantially cylindrical wall portion, said wall portion having an opening therethrough adapted to register with the port in said valve casing when the valve is open, means disposed within said valve member for bearing against and flexing the said wall portion centrally of the port in said valve casing when the valve is closed whereby to afford a tight sealing contact around the edge of the port and the said wall portion, and means for automatically reducing the force exerted against the said wall portion as the said valve member is moved to an open position.

5. A valve assembly comprising a valve casing having a port therethrough, a rotatable valve member having a flexible substantially cylindrical wall portion, said wall portion having an opening therethrough adapted to register with the port in said valve casing when the valve is open, spring means disposed within said valve member for bearing against and flexing the said wall portion centrally of the port in said valve casing when the valve is closed whereby to afford a tight sealing contact between the edge of the port and the valve member, and means for automatically reducing the force exerted by said spring means against said wall portion when the valve member is turned to an open position.

6. A valve assembly comprising a valve casing having a plurality of ports therethrough, a rotatable valve member having a flexible substantially cylindrical wall portion, said wall portion having openings therethrough for affording communication between said ports when the valve is open, a spring member disposed within said valve member and rotatable therewith and having portions thereof disposed so as to bear against and flex the said wall portion centrally of the ports in said valve casing when the valve is closed whereby to afford a tight sealing contact between the edges of the ports and the valve member, and means for reducing the force exerted by said spring member against the wall portion of said valve member as the valve is turned to an open position.

7. A valve assembly comprising a valve casing having a plurality of ports therethrough, a rotatable valve member having a flexible substantially cylindrical wall portion, said wall portion having openings therethrough for affording communication between said ports when the valve is open, a spring member disposed within said valve member and rotatable therewith and having portions thereof disposed so as to bear against and flex the said wall portion centrally of the ports in said valve casing when the valve is closed whereby to afford a tight sealing contact between the edges of the ports and the valve member, and a freely rotatable member mounted in said valve casing and connected to said spring member for rotation therewith, said freely rotatable member having a limited movement axially of said valve member whereby to automatically reduce the force exerted by said spring member against the wall portion of the valve member when the valve is turned to an open position.

8. A valve assembly comprising a valve casing having a plurality of ports therethrough, a rotatable valve member having a flexible substantially cylindrical wall portion, said wall portion having openings therethrough for affording communication between said ports when the valve is open, a spring member disposed within said valve member and rotatable therewith and having portions thereof disposed so as to bear against and flex the said wall portion centrally of the ports in said valve casing when the valve is closed whereby to afford a tight sealing contact between the edges of the ports and the valve member, and an adjusting member threadedly mounted in said valve casing for free rotation and for limited movement axially of said valve member, a portion of said spring member being connected to said adjusting member whereby the force exerted by said spring member against the wall portion of the valve member is automatically reduced when the valve is turned to an open position.

ARTHUR L. PARKER.